US008554756B2

(12) United States Patent
Gemmell et al.

(10) Patent No.: US 8,554,756 B2
(45) Date of Patent: Oct. 8, 2013

(54) INTEGRATING SOCIAL NETWORK DATA WITH SEARCH RESULTS

(75) Inventors: David James Gemmell, Danville, CA (US); Min-John Lee, Santa Cruz, CA (US); Ashok K. Chandra, Saratoga, CA (US); Vincent Vergonjeanne, Paris (FR)

(73) Assignee: Microsoft Corporation, Redmond, WA (US)

( * ) Notice: Subject to any disclaimer, the term of this patent is extended or adjusted under 35 U.S.C. 154(b) by 86 days.

(21) Appl. No.: 12/823,511

(22) Filed: Jun. 25, 2010

(65) Prior Publication Data

US 2011/0320423 A1 Dec. 29, 2011

(51) Int. Cl.
*G06F 7/00* (2006.01)
*G06F 17/30* (2006.01)

(52) U.S. Cl.
CPC .. *G06F 7/00* (2013.01); *G06F 17/30* (2013.01)
USPC ............ 707/706; 707/722; 707/732; 707/769

(58) Field of Classification Search
None
See application file for complete search history.

(56) References Cited

U.S. PATENT DOCUMENTS

| | | | |
|---|---|---|---|
| 7,159,011 B1 * | 1/2007 | Knight et al. | 709/207 |
| 7,613,769 B1 | 11/2009 | Hess | |
| 2005/0131872 A1 * | 6/2005 | Calbucci et al. | 707/3 |
| 2006/0106788 A1 * | 5/2006 | Forrest | 707/4 |
| 2006/0240856 A1 | 10/2006 | Counts et al. | |
| 2007/0078828 A1 * | 4/2007 | Parikh et al. | 707/3 |
| 2007/0162432 A1 | 7/2007 | Armstrong et al. | |
| 2007/0214132 A1 * | 9/2007 | Grubb et al. | 707/5 |
| 2008/0040673 A1 | 2/2008 | Zuckerberg et al. | |
| 2008/0077574 A1 | 3/2008 | Gross | |
| 2008/0103907 A1 * | 5/2008 | Maislos et al. | 705/14 |
| 2009/0164929 A1 | 6/2009 | Chen et al. | |
| 2009/0222551 A1 * | 9/2009 | Neely et al. | 709/224 |
| 2009/0249451 A1 | 10/2009 | Su et al. | |
| 2009/0313244 A1 | 12/2009 | Sokolenko et al. | |
| 2010/0082398 A1 | 4/2010 | Davis et al. | |
| 2010/0153832 A1 * | 6/2010 | Markus et al. | 715/205 |
| 2011/0276643 A1 * | 11/2011 | Fischman et al. | 709/206 |
| 2011/0282732 A1 * | 11/2011 | Bax et al. | 705/14.44 |

FOREIGN PATENT DOCUMENTS

KR 1020070043949 A 4/2007
WO 2009001138 A1 12/2008

OTHER PUBLICATIONS

Shishirs., "Social Media Monitoring", Retrieved at << http://blogs.msdn.com/shishirs/archive/2009/04/23/social-media-monitoring.aspx >>, Apr. 23, 2009, pp. 2.

(Continued)

*Primary Examiner* — Jay Morrison
(74) *Attorney, Agent, or Firm* — Microsoft Corporation

(57) ABSTRACT

A user of a social network may submit a search query relating to one or more topics to a search engine indexing a set of data items, but the search results, while authoritative and informative, may be highly impersonal with respect to the user. Conversely, the user may search for social data items within the social network relating to the topics, and such social data items may be more highly personalized to the user, but may also be inaccurate or incomplete. Instead, the search query may be applied to both the search engine and the social network, and the selected search results and social data items may be integrated into a presentation featuring both authoritative and personalized information about the topics associated with the search query.

20 Claims, 8 Drawing Sheets

(56) References Cited

OTHER PUBLICATIONS

Miguel, Renay S., "What Can Google Social Search Actually Find?", Retrieved at << http://www.technewsworld.com/story/68487.html >>, Oct. 27, 2009, pp. 4.

Perez, Sarah., "Social Feed Reading with Shyftr", Retrieved at << http://www.readwriteweb.com/archives/social_feed_reading_with_shyftr.php >>, Mar. 6, 2008, pp. 3.

"RSS Owl | RSS / RDF / Atom Feed Reader", Retrieved at << http://sourceforge.net/projects/rssowl/ >>, Retrieved Date: Feb. 9, 2010, pp. 2.

"International search report", Mailed Date: Jan. 2, 2012, Application No. PCT/US2011/041216, Filed Date: Jun. 21, 2011, pp. 8.

* cited by examiner

INTEGRATING SOCIAL NETWORK DATA WITH SEARCH RESULTS

BACKGROUND

Within the field of computing, many scenarios involve the presentation of a set of search results in response to a search query generated by a user. The user may submit the search query against many types of search engines indexing many types of data sets, including a set of web resources (including a small set of pages, such as an intranet or the pages of a website), a set of media objects such as images or musical performances, a set of records in a database, or a set of advertisements for various products and services. The search results may then be presented to the user in many ways (e.g., as a set of uniform resource identifiers (URIs) to the search results comprising web resources, or as a tiled set of thumbnails representing various images selected from an image database.)

A more recent trend within the field of computing is the rise of social networking, wherein users may establish associations representing relationships with other users, and may share data of interest with all or some associated users. In this context, a user may establish a social profile comprising data that identifies various aspects of the user to associated users, such as demographic information, a set of interests such as hobbies or professional skills, and a set of resources that are interesting to the user. Users may choose to share certain social data items with other users (e.g., public or targeted messages, images such as photos, files, and references to interesting resources, such as a web page of a website.) The user may also choose to draw attention to social data items shared by other users (e.g., by "reposting" the social data items to appear within a news feed associated with the user.) The social network may permit the user to specify the extent of sharing (e.g., whether a social data item is to be shared with specified individual users or groups of users, with any associated user who has an association with the user, with any user of the social network, or with users outside of the social network.) In this manner, users may share social data items over the social network with other users.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A user seeking information about a particular topic may consider alternative techniques for retrieving this information. As a first example, the user may formulate a search query regarding the topic and submit the search query to an appropriate search engine (e.g., a web search engine that may yield references to websites discussing the topic; a product search engine, such as provided by an e-commerce site, that may yield products and possibly product reviews matching the search query; or an image search engine that may yield images associated with the topic.) However, these search results are likely to be impersonal, e.g., not taking into account the details of the user. As a second example, the user may search for social data items within the social network that relate to the topic, in order to retrieve information that is personal to the user (e.g., deriving from the social network of the user, which may have similar backgrounds, education levels, and beliefs as the user.) However, this endeavor may be inadequate in several respects. Some social network might not permit a broad search of the social network for social data items associated with a topic or search query, or may only permit limited searching of a small set of social data items, and manual searching may be time-consuming and low-yield. Additionally, if the social network of the user (e.g., the set of associated users having an association with the user) is comparatively disinterested in or uninformed about the topic, a search of the social network may yield little information or inaccurate information. Therefore, it may be inefficient for the user to search only the social network for information about the topic.

In view of these considerations, techniques are presented herein that permit a user to submit a search query and to receive a search result set that includes both authoritative information, written by highly trusted information sources, and personalized information, written by users who are close to the user and who may share similar opinions. These techniques involve executing the search query on a search engine to receive a set of search results, while also identifying one or more topics associated with the search query and searching the social network for social data items associated with the topic. The search results returned by the search engine may be combined with the social data items retrieved from the social network to present to the user an aggregated set of search results featuring both reliable information and personalized information. By examining the combined search results, the user may receive information about the topics associated with the search query both from within the social network of the user and from the broader, impersonal set of information that is indexed by the search engine.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
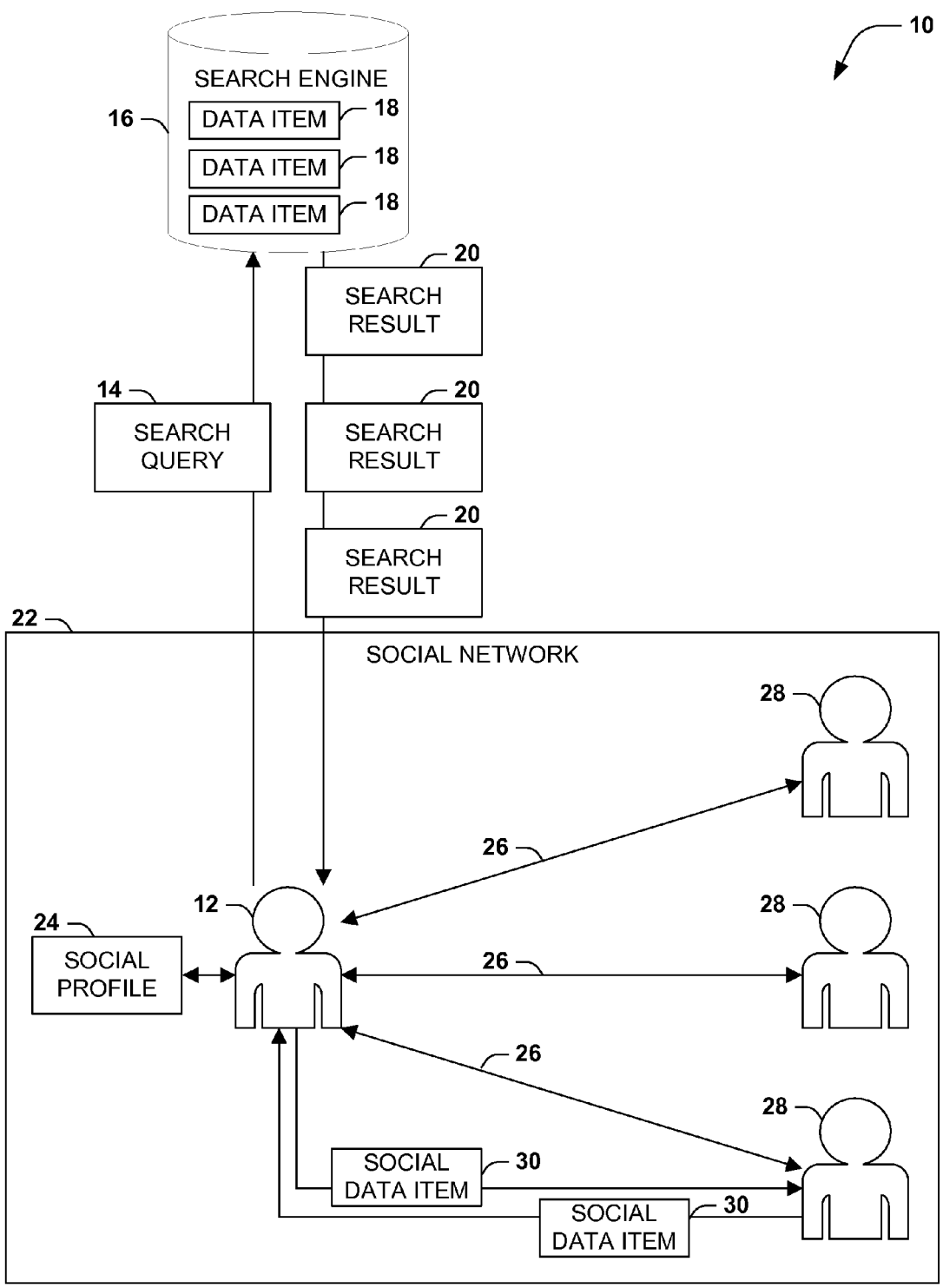
FIG. 1 is an illustration of an exemplary scenario featuring a presentation of search results for a search query generated by a user of a social network.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, two common scenarios and sets of techniques have arisen that, according to the present disclosure, may share a nexus of functionality. The first scenario involves the application of a search query generated by a user to a search engine indexing a data set to produce a set of search results. Many such search engines have been devised to apply search queries to many types of search engines (e.g., a web search engine configured to index a set of web resources, such as websites of various web pages; a media database configured to index various properties of a set of media objects, such as images, music, or videos; and an advertisement database configured to select advertisements from an advertisement set that are targeted based on the details of a user.) Many types of queries may also be accepted and applied to these search engines, such as keyword queries, natural language queries (sometimes received as speech through a speech recognition engine), logical queries specifying sets of criteria connected by Boolean operators, and queries specified in a search query language, such as a structured query language (SQL) or variant thereof. The search results may also be provided in many forms, such as a simple list of uniform resource identifiers (URIs) of matching web resources, a tiled set of thumbnails of matching images, or a preview of a matching video.

The second scenario involves a social network, where each user may each create a social profile that represents and describes the user, and where the users may then establish associations representing various types of relationships with other users (such as family relationships, friendships, acquaintanceships, and professional or academic relationships.) Users of the social network may also share information with other users via the social network, such as public demographic information (e.g., the individual's age and race), academic and career history, and interests (e.g., hobbies, skills, or preferences in books and music.) Users may also share different types of data items within the social network with other users. For example, a user may generate many types of messages, such as personal messages directed to particular users or particular user groups, chat messages to be delivered to particular users participating in the chat session, and public comments that may be broadly viewed by many users of the social network. A user may also share other types of data items within the social network, such as documents, images, music, videos, files, information stored in the social profile of the user, and references to various types of resources (e.g., uniform resources identifiers (URIs) that reference resources available on the internet, such as a web page of a website.) The social network may also be able to specify varying levels of privacy for respective social data items, e.g., that a particular social data item is accessible only to specified users and/or user groups, or only by a well-defined set of users (such as the users having a relationship with the user generating the social data item), with all users of the social network, or even with users outside of the social network. Accordingly, some such information may be completely public and viewable by anyone, while other information may be shared only with associated users who are associated with the user by a relationship, and still other information may be shared only with a subset of associated users. However, a user may also permit associated users to share some of the information in the social profile with still others (e.g., a user may permit friends to "repost" or republish a message for viewing by any other users who have established associations with the friends.)

FIG. 1 presents an exemplary scenario 10 featuring a user 12 who has established an identity in a social network, and who wishes to search a data set for a particular set of items. In this exemplary scenario, the user 12 submits a search query 14 to a search engine 16 having a set of data items 18, such as an indexed set of web resources (such as web pages), a set of media objects (such as images, video or audio recordings, or text documents), or a set of advertisements for various products or services. The search engine 16 may apply the search query 14 by comparing the search criteria specified therein against the indexed data items 18, selecting data items 18 that match the criteria, and providing the selected data items 18 as search results 20. The search results 20 may be presented to the user 12 in many ways, e.g., as a set of links, such as uniform resource identifiers (URIs) identifying the matching web resources, a tiled set of thumbnails of various images, or a set of advertisements that may be embedded in various forms of content that may be presented to the user 12.

As further illustrated in FIG. 1, the user 12 may participate in a social network 22 by establishing associations 26 within the social network with one or more associated users 28. These associations 26 may comprise unidirectional associations (e.g., where the user 12 indicates an interest in content produced by the associated user 28) or bidirectional associations (e.g., where the user 12 and the associated user 28 agree on the existence and nature of the relationship therebetween, such as a familial, romantic, friend, acquaintance, academic, or professional relationship.) The user 12 may also generate a social profile 24, comprising various types of information about the user 12 that the user 12 wishes to share with other users 12 of the social network 22. The social network 22 may permit user 12 to specify that particular elements of the social profile 24 may be accessible only to these associated users 28, or may permit the associated users 28 to share the social profile 24 with other individuals (such as other users 12 who have established associations 26 with the associated users 28), or may be publicly accessible to any users 12 of the social network 22. Similarly, the user 12 may wish to view the social profiles 24 defined by the associated users 28, and thus may request and review the social profiles 24 of the associated users 28 within the social network 22. Additionally, the user 12 may share many types of social data items 30 with other users 12 of the social network 22, such as personal comments, messages directed to particular other users 12, such as comments about the user's beliefs and experiences, messages directed to one or more other users, images such as personal photos, calendar-related data items such as events, various types of files and documents, and references to resources, such as uniform resource identifiers (URIs) referencing interesting websites or articles provided therein. The user 12 may also choose to share these social data items 30 with particular users 12 within the social network 22, with a general group of users 12 (such as all associated users 28 having an association 26 with the user 12), or with any user 12 of the social network 22.

These scenarios may arise frequently and in many contexts in the field of computing. For example, a user 12 may be interested in a particular topic, and may consider the different options for retrieving information about the topic. As a first example, the user 12 may devise a search query 14 associated with the topic, and may submit the search query 14 to a search engine 16 that may index and provide as search results 20 one or more data items 18 regarding the topic, such as links to web pages relating to the topic; products associated with the topic that may be available from one or more e-commerce sites, or product reviews in a product reviews database; or images, songs, videos, or documents relating to the topic and stored in a media database. If the search query 14 is submitted to a search engine 16 indexing a suitably broad set of data items 18 (such as many websites accessible via the internet), the search results 20 may include a large set of information, including many search results 20 generated by highly well-informed, reliable, and authoritative sources. However, this type of search may fail to provide any type of personalized results that may reflect any information about the user 12, such as the information stored in the social profile 24. For example, if the user 12 seeks a product recommendation of a product in a particular product area, the search engine 16 may provide search results 20 that recommend a high-quality product in the product area, but may be unable to provide search results 20 that recommend a product specifically in view of the circumstances of the user 12 (e.g., brand preferences, level of consumer sophistication, and a set of other products that the user 12 already owns.) The search results 20 returned by the search engine 16 may therefore be highly impersonal with regard to the details of the user 12.

As a second example, the user 12 may seek information about the topic within the social network 22. For example, the user 12 may generate a message soliciting information about the topic from the associated users 28 who have associations 26 with the user 12; may utilize a search engine within the social network 22 to search for social data items 30 that may relate to the topic; or may manually seek information about the topic through the social network 22 (e.g., by examining the social data items 30 of users 12 who may be knowledgeable about and interested in the topic.) These sources of information may be more personal to the user 12, such as the user's family, friends, and professional associations, and the information obtained therefrom may be more personalized for the user 12 (e.g., possibly reflecting the preferences and experiences of the social group including the user 12, which may also reflect the preferences and experiences of the user 12.) However, this option may also be inadequate in several respects. First, the social network 22 may not provide a robust search engine that is capable of searching all of the social data items 30 that may be accessible to the user 12, because it may be difficult to scale the indexing and search engine to accommodate the potentially massive number of social data items 30 that may be accessible to the user 12. Rather, the social network 22 may provide a search engine that only examines a select set of social data items 30 (e.g., messages posted by users 28 within a recent but brief period of time, such as the preceding two weeks), and this set of social data items 30 may be too limited to provide sufficient information. Conversely, a manual search of the social data items 30 that may be accessible to the user 12 may be time-consuming and low-yield. Second, users 12 of the social network 22 of the user 12 may be uninterested in the topic, and may generate few or no social data items 30 relating to the topic. Third, users 12 of the social network 22 of the user 12 may be uninformed or biased, and may therefore provide incomplete or inaccurate information about the topic to the user 12. Therefore, while the information that the user 12 might obtain from the social network 22 may be more highly personalized for the circumstances of the user 12, the information may also be insufficiently reliable or complete.

In view of these circumstances, presented herein are techniques that may be utilized to fulfill a search query 14 relating to a topic and generated by a user 12 in a manner that provides both reliable (but possibly impersonal) search results 20 and personalized (but possibly unreliable) social data items 30 relating to the topic. According to these techniques, the search query 14 of the user 12 may be submitted to a search engine 16 to retrieve a set of search results 20. Additionally, the search query 14 may be evaluated to identify one or more topics associated with the search query 14, and the social data items 30 within the social network 22 of the user 12 may be examined to select social data items 30 that relate to at least one of the topics. The search results 20 generated by the search engine 16 may be combined with the social data items 30 selected from the social network 22 of the user 12, and these results may be presented together, thereby providing a composite set of results including both authoritative (but impersonal) and personalized (but non-authoritative) information about the one or more topics of the search query 14.

Figure 2:
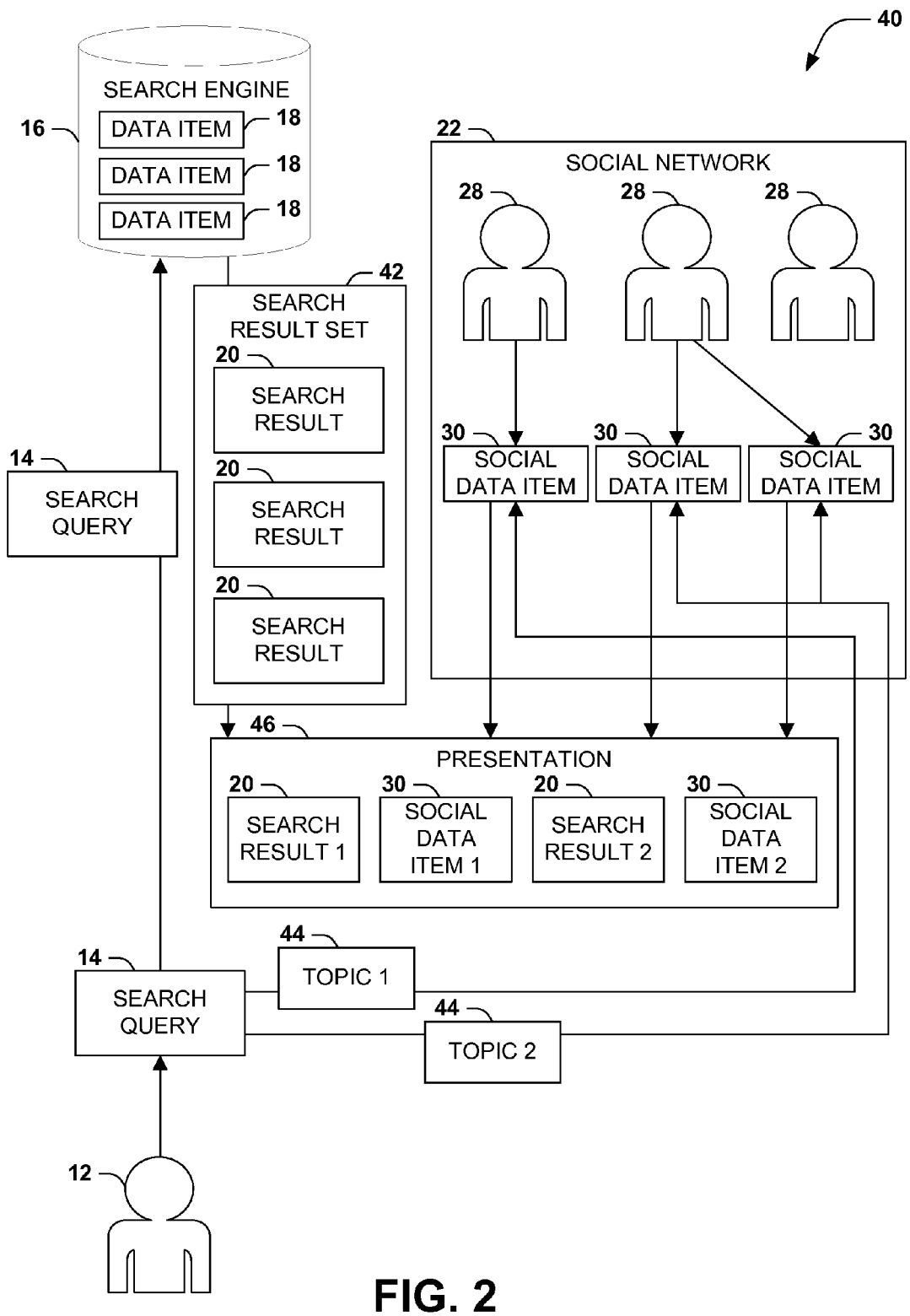
FIG. 2 is an illustration of an exemplary scenario featuring a presentation of personalized search results for a search query generated by a user of a social network according to the techniques presented herein.

FIG. 2 presents an illustration of an exemplary scenario 40 featuring a presentation of personalized search results in response to a search query 14 generated by a user 12 of a social network 22 according to the techniques presented herein. In this exemplary scenario 40, the user 12 generates the search query 14 and requests to receive a presentation 46 of search results. Accordingly, the search query 14 is submitted to a search engine 16 storing a set of data items 18, which may generate a search result set 42 comprising a set of search results 20 that are associated with the search query 14. Additionally, the search query 14 may be used to retrieve relevant social data items 30 from the social network 22 in the following manner. The search query 14 may first be evaluated to identify one or more topics 44 that are associated with the search query 14 (e.g., names, distinctive keywords, or topical identifiers associated with one or more topics 44 may be included in the search query 14.) For each such topic 44, the social network 22 may be consulted to identify one or more social data items 30 (e.g., personal or public messages, comments, personal status messages, images, notes, documents, files, or uniform resource identifiers (URIs) referring to various types of web resources) that relate to the topics 44, and that are shared by the associated users 28 who have an association 26 with the user 12. These social data items 30 may be combined with the search results 20 of the search result set 42 generated by the search engine 40 to form a presentation 46 of results in response to the search query 14. This presentation 46 includes both the potentially authoritative but impersonal search results 20 generated (without knowledge of the circumstances of the user 12) by the search engine 16, and also the personal but non-authoritative social data items 30 associated with the topics 44 of the search query 14 and generated by associated users 28 who have an association 26 with the user 12. In this manner, the presentation 46 may provide to the user 12 a set of information associated with the search query 14 that is both reliable and personalized, in accordance with the techniques presented herein.

Figure 3:
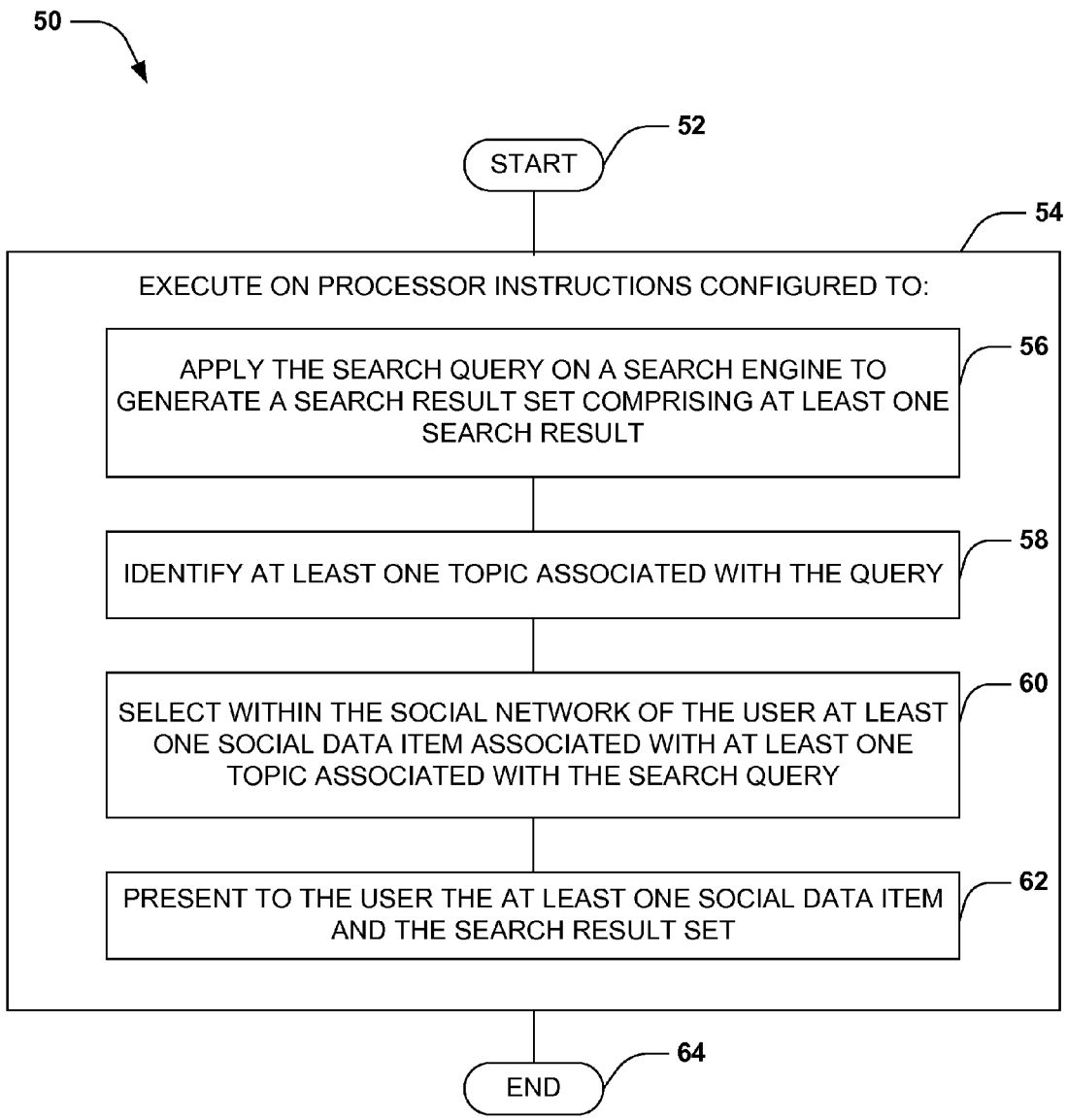
FIG. 3 is a flow chart illustrating an exemplary method of presenting personalized search results for a search query generated by a user of a social network.

FIG. 3 presents a first embodiment of these techniques, illustrated as an exemplary method 50 of presenting personalized search results for a search query 14 generated by a user 12 of a social network 22. The exemplary method 50 may be implemented, e.g., as a set of software instructions stored on a volatile or nonvolatile memory (e.g., system memory, a hard disk drive, a solid state storage device, or an optical or magnetic disc) of a device, and that may be executed by a processor of the device. The exemplary method 50 begins at 52 and involves executing 54 on the processor instructions configured to perform the techniques presented herein. In particular, the instructions may be configured to apply 56 the search query 14 on a search engine 16 to generate a search result set 42 comprising at least one search result 20. The instructions may also be configured to identify 58 at least one topic 44 associated with the search query 20, and to select 60, within the social network 22 of the user 12 (e.g., among the set of social data items 30 generated and shared by the associated users 28 who have an association 26 with the user 12), at least one social data item 30 associated with at least one topic 44 associated with the search query 14. The instructions are also configure to present 62 to the user 12 the at least one social data item 30 and the search result set 42. Having achieved the presentation of personalized search results derived from both the search engine 16 and the social network 22, the exemplary method 50 ends at 64.

Figure 4:
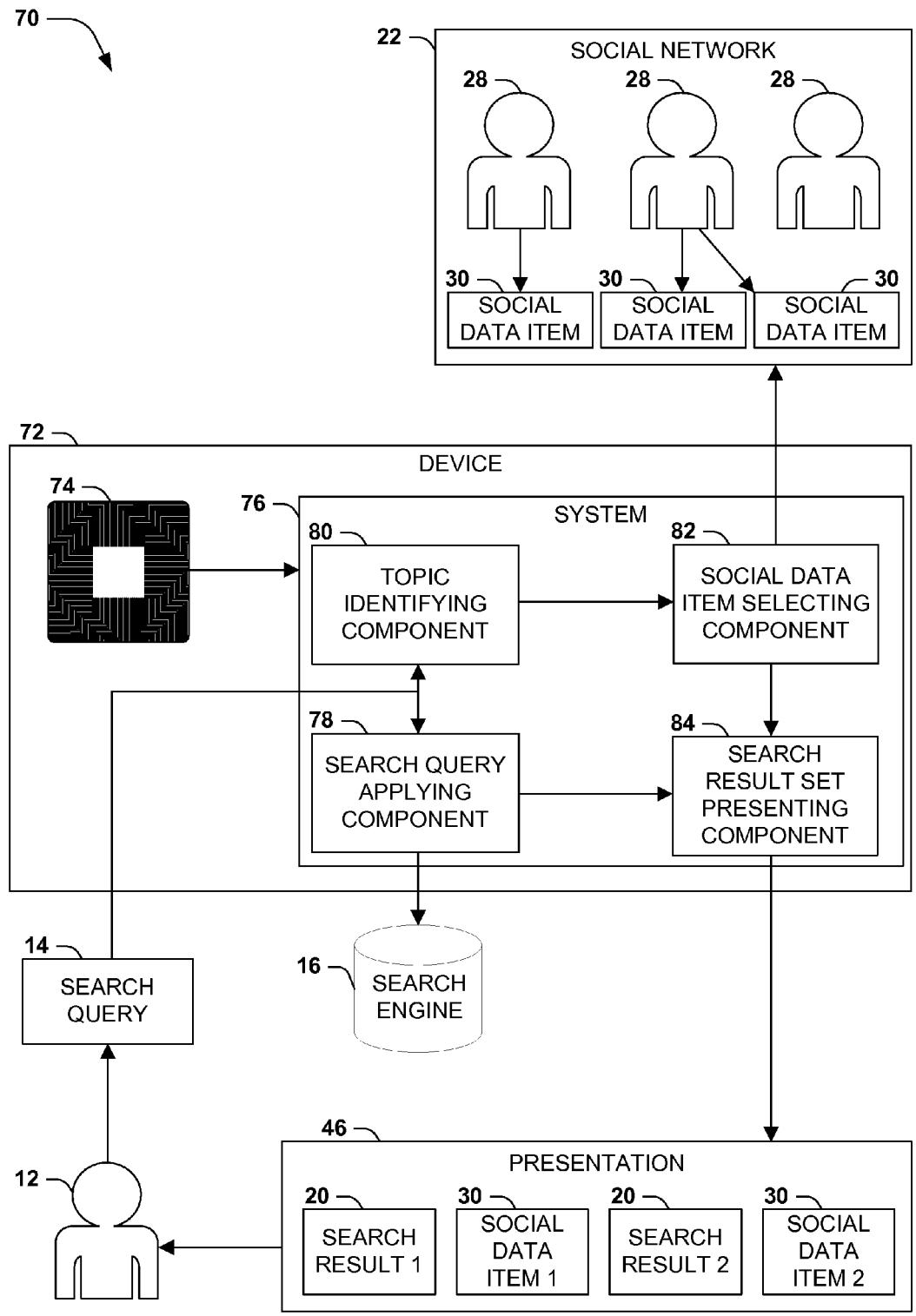
FIG. 4 is a component block diagram illustrating an exemplary system for presenting personalized search results for a search query generated by a user of a social network.

FIG. 4 presents a second embodiment of these techniques, illustrated as an exemplary system 76 operating within a device 72 having a processor 74 and configured to present personalized search results for a search query 14 generated by a user 12 of a social network 22. The exemplary system 76 may be implemented, e.g., as a software architecture comprising a set of interoperating software components, each encoded as a set of software instructions stored in a volatile or nonvolatile memory (e.g., system memory, a hard disk drive, a solid state storage device, or an optical or magnetic disc) of the device 72, that, when executed on the processor 74 in an interoperative manner, perform the techniques presented herein. The device 72 also has access to a search engine 16 configured to index a set of data items 18 (such as web pages of various websites or images in an image set), as well as a social network 22 comprising a set of users 12, some comprising associated users 28 who have an association 26 with the user 12, and a set of social data items 30 generated and shared thereby. The exemplary system 76 comprises a search query applying component 78, which is configured to apply the search query 14 on the search engine 16 to generate a search result set 42 comprising at least one search result 20. The exemplary system 76 also comprises a topic identifying component 80, which is configured to identify at least one topic 44 associated with the search query 14, and a social data item selecting component 82, which is configured to select, within the social network 22 of the user 12, at least one social data item 30 associated with at least one topic 44 associated with the search query 14 (as identified by the topic identifying component 80.) The exemplary system 76 also comprises a search result set presenting component 84, which is configured to present to the user 12 the at least one social data item 30 selected by the social data item selecting component 28 and the search result set 42 received by the search query applying component 78. The interoperating elements of the exemplary system 76 thereby achieve a presentation to the user 12 of personalized information responsive to the search query 14, incorporating both authoritative (but impersonal) search results 20 from the search engine 16 and personalized (but non-authoritative) social data items 30 generated by the users 12 comprising the social network 22 of the user 12.

Figure 5:
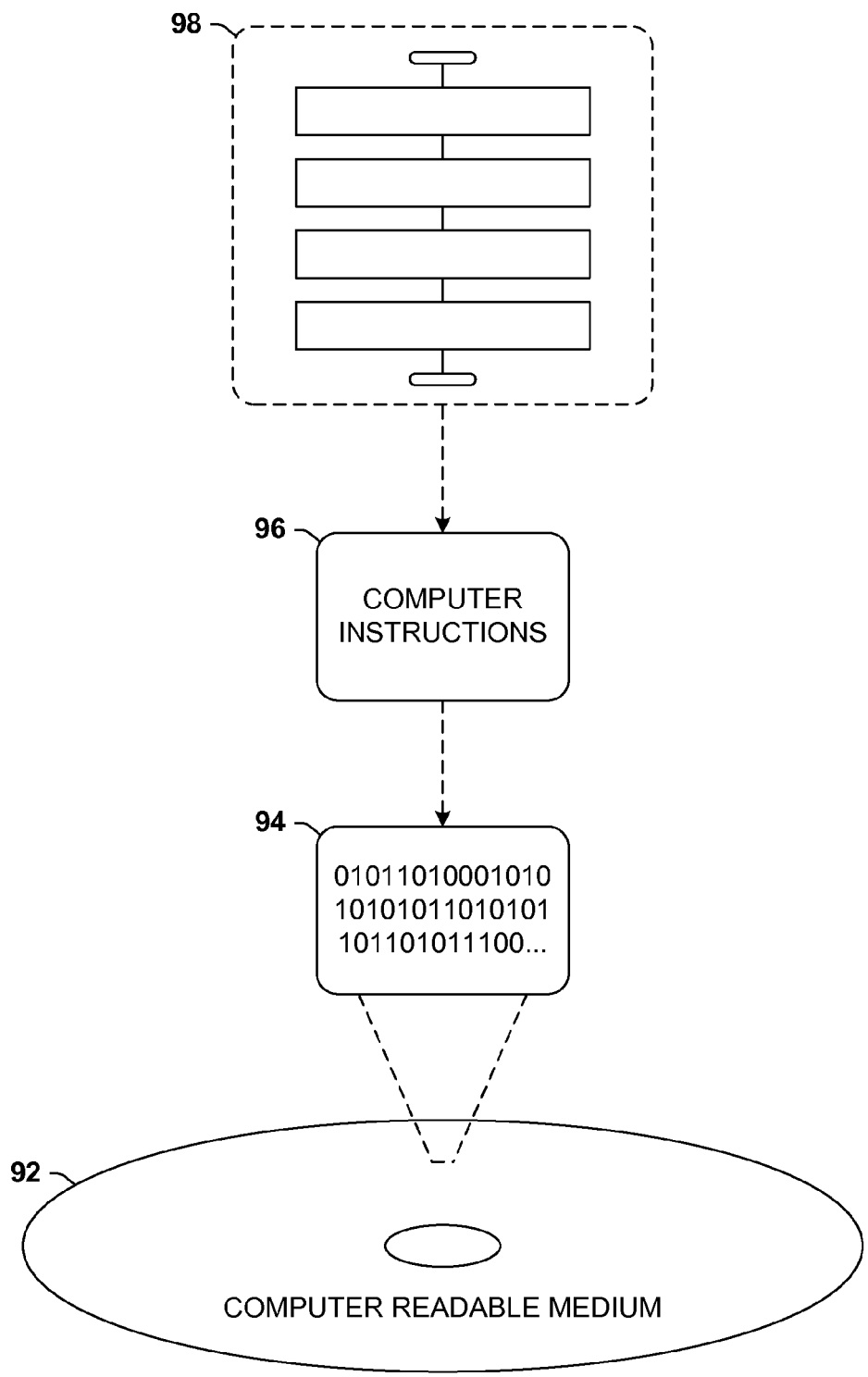
FIG. 5 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 5, wherein the implementation 90 comprises a computer-readable medium 92 (e.g., a CD-R, DVD-R, or a platter of a hard disk drive), on which is encoded computer-readable data 94. This computer-readable data 94 in turn comprises a set of computer instructions 96 configured to operate according to the principles set forth herein. In one such embodiment, the processor-executable instructions 96 may be configured to perform a method of presenting personalized search results for a search query generated by a user of a social network, such as the exemplary method 50 of FIG. 3. In another such embodiment, the processor-executable instructions 96 may be configured to implement a system for presenting personalized search results for a search query generated by a user of a social network, such as the exemplary system 76 of FIG. 4. Some embodiments of this computer-readable medium may comprise a non-transitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 50 of FIG. 3 and the exemplary system 76 of FIG. 4) to confer individual and/or synergistic advantages upon such embodiments.

A first aspect that may vary among embodiments of these techniques relates to the scenarios wherein such techniques may be utilized. As a first example, the search engine 16 may be configured to index and search many types of data items 18, including web resources (such as web pages of various websites) identified by a uniform resource identifier (URI), a set of media objects (such as images, video and audio recordings, and text documents) stored in a media library, and a set of advertisements stored in an advertisement set. As a second example of this first aspect, the search query 14 may be specified in many ways, such as a natural language query, a keyword query, a logical query featuring criteria connected by Boolean logical operations, and a query specified in a structured query language (SQL). As a third example of this first aspect, many types of social networks 22 may be involved, such as genealogical social networks involving familial relationships among users 12, friendship social networks involving friendships among users 12, academic or professional social networks involving academic or business relationships among users 12, dating social networks involving romantic associations 26 among users 12, and gaming social networks involving teammate relationships among users 12 in online games. As a fourth example of this first aspect, the social network 22 of the user 12 may be defined, e.g., as all users 12 represented within a social network 22 that includes the user 12; as all associated users 28 in the social network 22 who have an association 26 with the user 12; or as a subset of users 12 (e.g., users 12 belonging to a social group that includes the user 12.) As a fifth example of this first aspect, many types of social data items 30 may be examined within the social network 22 of the user 12, including textual data items, images such as photos, media objects such as audio and video recordings, documents, data sets formatted in various ways (such as according to an extensible markup language (XML) schema), and files of various types. Those of ordinary skill in the art may devise many scenarios wherein the techniques presented herein may be advantageously utilized.

A second aspect that may vary among embodiments of these techniques relates to the architectures of implementations of these techniques. As a first example, an embodiment of these techniques may be implemented by various components or devices illustrated within these scenarios. As a first variation, an embodiment of these techniques may be implemented by a search engine 16, which may, upon receiving a search query 14 from a user 12, retrieve relevant social data items 30 from the social network 22 of the user 12 to supplement the search results 18 presented to the user 12. (In particular, this variation may involve configuring the search engine 16 to receive from the user 12 and store at least one social network credential, and to, upon receiving a search query 14 from the user 12, authenticating the user 12 with the social network 22 using the at least one social network credential, in order to access the social network 22 of the user 12.) As a second alternative, an embodiment of these techniques may be implemented by the social network 22, which may be configured to receive a search query 14 from a user 12 of the social network 22, and to supplement the social data items 30 selected in response to the search query 14 with search results 18 retrieved from a search engine 16 by the social network 22. As a third alternative, an embodiment of these techniques may be implemented by a device operated by the user 12, which may be configured to, upon receiving a search query 14 from the user 12, send the search query 14 both to a search engine 16 and the social network 22, may receive both the search results 18 from the search engine 16 and the social data items 30 from the social network 22, and may present these results together for the user 12. As a fourth alternative, an independent aggregating service may be configured to aggregate the search results of a search engine 16 and the social data results 30 of the social network 22 of the user 12, and to generate a combined presentation 46 of this information to the user 12.

As a second example of this second aspect, the exemplary system 76 of FIG. 4 presents one suitable architecture of an embodiment of these techniques, but other architectures may also be devised, some of which may present additional advantages. As a first example, the topic identifying component 80 and the social data item selecting component 82 may be united as a component that, upon receiving the search query 14, compares the contents of the search query 14 to respective social items 30 of the social network 22 of the user 12 to identify and select those that appear to relate to the same topics 44. Alternatively, the system 76 may be configured to evaluate respective social data items 30 upon receipt from the users 12 of the social network 22 and to identify the topics 44 associated with each social data item 30, thereby building an index of social data items 30 relating to respective topics 44. The embodiment may then select social data items 30 relating to a particular topic 44 by consulting the index and simply retrieving the identified social data items 30 (and possibly limiting these social data items 30 based on the access privileges of the user 12 thereto.) Those of ordinary skill in the art may devise many architectures upon which embodiments of these techniques may be based.

A third aspect that may vary among embodiments of these techniques relates to the manner of identifying 58 topics 44 associated with the search query 14. As a first example, various topics 44 may be associated with one or more topical identifiers, such as a name (e.g., the recognizable name of a celebrity or a well-known location), a distinctive keyword, or a distinctive identifier, such as a uniform resource identifier (URI) identifying a location of a resource comprising or describing the topic 44. As a second example of this third aspect, various natural-language parsing techniques may be utilized to infer the topics 44 based on the semantic content of the search query 14. As a third example of this third aspect, the search engine 16 may be able to identify one or more topics 44 associated with the search query 14 (e.g., while evaluating the search query 14 during the selection of data items 18 as search results 20), and the identification of topics 44 by the search engine 16 may be utilized to select associated social data items 30 from the social network 22 of the user 12. Those of ordinary skill in the art may devise many ways of identifying topics 44 associated with the search query 14 while implementing the techniques presented herein.

A fourth aspect that may vary among embodiments of these techniques relates to the manner of selecting social data items 30 that are associated with the topics 44 associated with the search query 14. As a first example, social data items 30 may be evaluated in many ways to identify topics 44 associated therewith. In a first such variation, respective social data items 30 may include one or more topical identifiers associated with various topics 44, such as a name (e.g., the recognizable name of a celebrity or a well-known location), a distinctive keyword, or a distinctive identifier, such as a uniform resource identifier (URI) identifying a location of a resource comprising or describing the topic 44. In a second such variation, various evaluative techniques, such as natural-language parsing techniques applied to textual social data items 30 and machine vision techniques applied to image-based social data items 30, may be utilized to infer the topics 44 associated with the social data items 30.

As a second example of this fourth aspect, the timing of identifying the topics 44 associated with the social data items 30 may vary. In a first such variation, the social network 22 may, upon receiving a social data item 30, evaluate the social data item 30 to identify the topics 44 associated therewith, and may store an association of the identified topics 44 with the social data item 30 (e.g., in an index.) In a second such variation, the social data items 30 may be evaluated in just-in-time manner; e.g., after receiving a search query 14 and identifying the topics 44 associated with the search query 14, an embodiment may evaluate social data items 30 in order to select those that are associated with these topics 44. While the first variation may yield higher performance (such as lower response times and higher scalability), the second variation may be more efficient; e.g., the pre-evaluation of social data items 30 may consume a significant amount of computing resources (such as processing cycles and storage space), but the social network 22 may infrequently receive search queries 14 involving the evaluation of social data items 30.

As a third example of this fourth aspect, additional limitations may be placed on the search query 14 to select only particular types of social data items 30. In a first such variation, the search query 14 may specify a different set of users 12 of the social network 22 whose social data items 30 may be evaluated for selection; e.g., the user 12 may specify that any social data item 30 (to which the user 12 has access) may be selected, or only social data items 30 generated by associated users 28 who have an association 26 with the user, or only social data items 30 generated by a particular subset of users 12 (such as the users 12 of the social network 22 who belong to a particular social group that includes the user 12.)

In a second variation of this third example of this fourth aspect, the user 12 may express a user interest in one or more topics 44, and the selection of social data items 30 within the social network 22 of the user 12 may be limited to those that also relate to at least one topic 44 in which the user 12 has expressed a user interest. The information about user interests may be stored, e.g., in the social profile 24 of the user 12, and may be retrieved and utilized in the evaluation of the search query 14 during the selection of social data items 30. For example, if the user 12 expresses a user interest in the topic 44 of automobiles and also generates a search query 14 including the keyword "mustang," the social data items 30 so selected may be limited to those associated with the topic 44 of the automobile associated with this keyword, and may exclude social data items 30 associated with other topics 44 associated with this keyword (such as animals, sports teams, and aircraft.

In a third variation of this third example of this fourth aspect, social data items 30 within the social network 22 of the user 12 may comprise many social data item types, such as textual messages, images, documents, video or audio recordings, references (such as URIs) to particular resources, or files. The search query 14 may include a limitation that social data items 30 are to be selected only of one or more social data item types, and the selection of social data items 30 within the social network 22 of the user 12 may be limited to social data items 30 of these specified social data item types. For example, the user 12 may only be interested in images, and the presentation 46 may include only social data items 30 comprising images selected from the social network 22 (and, possibly only search results 20 comprising images selected from among the data items 18 indexed by the search engine 16.)

In a fourth variation of this third example of this fourth aspect, various topics 44 associated with the social data items 30 within the social network 22 of the user 12 (e.g., mentioned in textual comments, depicted in images, and/or referenced by references) may exhibit a degree of user interest by various users 12 of the social network. Moreover, the user interest in a particular topic 44 may change over time, and these changes may reflect an interest trend in the topic 44, where a positive interest trend indicates that a greater number of users 12 of the social network 22 are expressing stronger user interest than expressed at a previous time, and where a negative interest trend indicates that fewer users 12 of the social network 22 are expressing user interest (and perhaps weaker user interest) than at a previous time. According to this third variation, social data items 30 may be selected for inclusion in the presentation 46 based on the detected user interest and interest trend in the social data items 30. For example, an embodiment may select only social data items 30 associated with one or more topics 44 associated with the search query 14 and that also demonstrate a sufficiently high user interest (e.g., exceeding a user interest threshold), or that also demonstrate a positive interest trend (e.g., demonstrating a stronger and/or broader degree of user interest in the topic 44 than at a previous time.) The user interest in various topics 44 may be identified in many ways, e.g., according to a reference frequency of references to the topic 44 by users 12 within the social network 22 (e.g., a high number of recent references to the topic 44 in comments posted by the users 12); according to a user interaction frequency of user interactions of users 12 of the social network 22 with social data items 30 associated with the topic 44 (e.g., a high number of comments replying to social data items 30 relating to the topic 44); according to a search query frequency of search queries 14 generated by the users 12 of the social network 22 associated with the topic 44 (e.g., a high number of search queries submitted that are associated with the topic 44); and, for topics 44 comprising products, the contents of user reviews of the product posted by users 12 of the social network 22 (e.g., a high number of users who attribute positive user ratings in user reviews of the product.)

Figure 6:
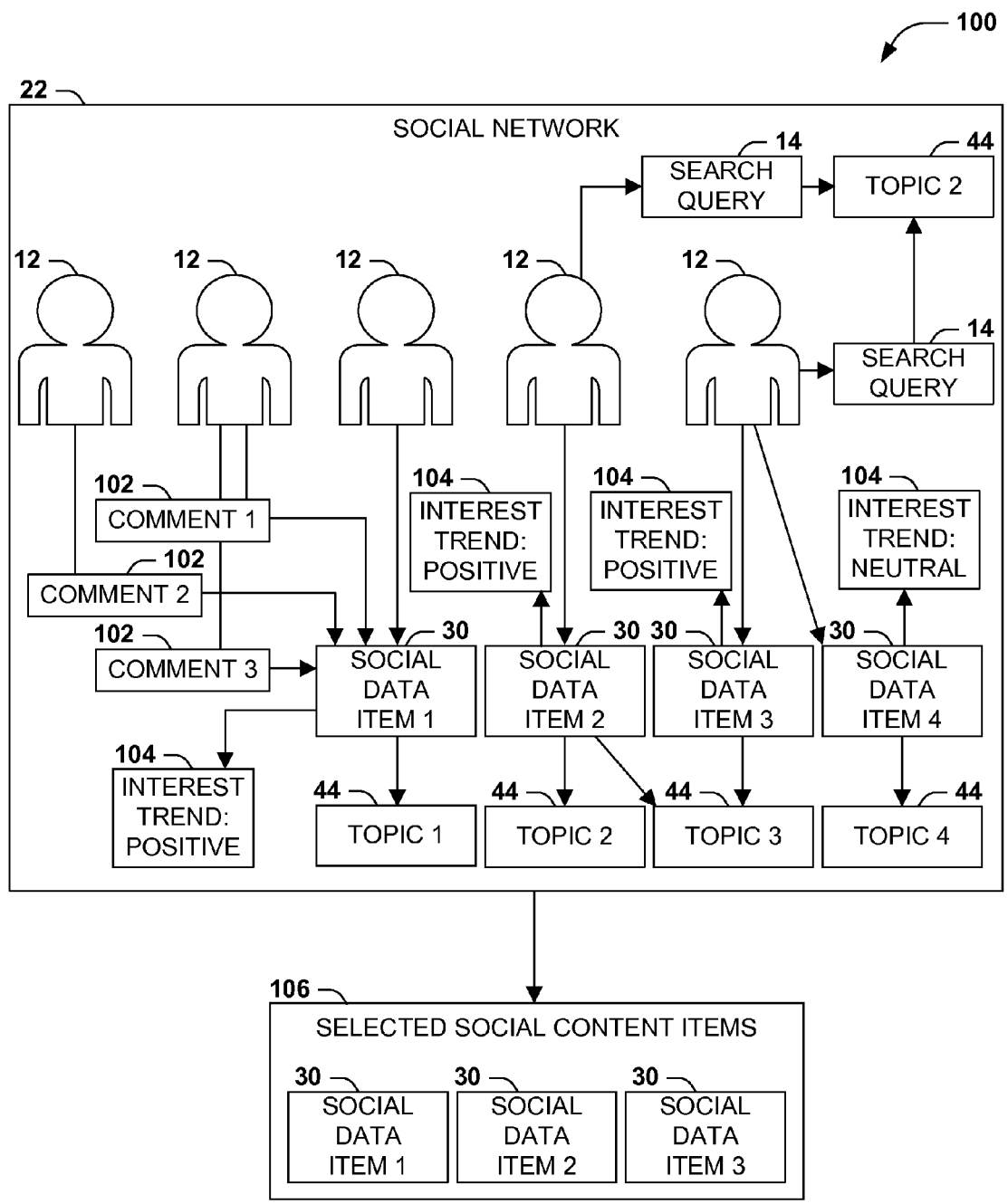
FIG. 6 is an illustration of an exemplary scenario featuring a selection of social content items from a social network based on positively trending popularities of associated topics.

FIG. 6 presents an exemplary scenario 100 featuring a selection of social data items 30 from a social network 22 based on the topics 44 associated therewith, and in particular related to the user interest expressed in the social data items 30. In this exemplary scenario 100, a set of users 12 generate a set of four social data items 30, and the social network 22 identifies the social data items 30 as associated with various topics 44 (all of which may be associated with a search query 14 submitted by a user 12.) Having so identified the topics 44 associated with the social data items 30, an embodiment may endeavor to select among these social data items 30 based on trends in the user interest expressed in the respective topics 44 (based on a comparison with a neutral or low user interest 104 expressed in the topics 44 at a previous time.) The first social data item 30 may have drawn a high amount of user interact from several users 12 in the form of comments 102. This first social data item 30 may therefore be identified as having a positive interest trend 104 and may be selected for inclusion in the presentation responsive to the search query 14. The second topic 44 may be associated with several search queries 14 submitted by users 12 of the social network 22. The second social data item 30, which relates to the second topic 44, may therefore be identified as having a positive interest trend 104 and may be selected for inclusion in the presentation responsive to the search query 14. A third topic 44 may be referenced by several social data items 30 posted within the social network 22. Accordingly, the third social data item 30, relating to the third topic 44, may therefore be identified as having a positive interest trend 104 and may be selected for inclusion in the presentation responsive to the search query 14. By contrast, the fourth topic 44 exhibits only a neutral interest trend 104, and so the fourth social data item 30 associated (only) with the fourth topic 44 may be excluded from the presentation. In this manner, an embodiment of these techniques may limit the selection of social data items 30 to those associated with topics 44 having a positive user interest, and/or a positive interest trend 104. Those of ordinary skill in the art may devise many ways of selecting social content items 30 for inclusion in the presentation to the user 12 while implementing the techniques presented herein.

A fifth aspect that may vary among embodiments of these techniques relates to the manner of presenting the search results 20 and the selected social data items 30 to the user 12. As a first example, the presentation 46 (when displayed on a display component of a device operated by the user 12, e.g., when a presentation 46 presented in a hypertext markup language (HTML) format is rendered in a web browser) may feature the search results 20 in a first region of the display, and the social data items 30 in a second region of the display that does not overlap the first region (e.g., above, below, or to one side of the first region.)

As a second example of this fifth aspect, the search results 20 and the social data items 30 may be presented together in the same region of the display, e.g., by integrating the social data items with the search results 20. This integration may be performed in many ways, e.g., by simply alternating the presentation of a search result 20 and a social data item 30 in a one-dimensional presentation of the search result set 42 (e.g., a vertical column showing search results 20 and social data items 30 in alternating rows.) As another integration technique, where the search results 20 are sorted according to a sort order (such as alphabetical or chronological), the social data items 30 may be integrated with the search results 20 according to the same sort order (e.g., alphabetically or chronologically sorting the social data items 30 into the search results 20.) In a particular variation of this integration technique, many search engines 16, while selecting search results 20, compute a relevance score indicating a relevance of the search result 20 to the search query 14, and position respective search results 20 within the search result set at a position associated with the relevance scores thereof (e.g., sorted in order of descending relevance scores.) It may be possible to compute relevance scores for respective social data items 30, e.g., based on the degree of association of the set of topics 44 with the social data item 30 and the corresponding set of topics 44 associated with the search query 14, and to integrate the social data items 30 with the search results 20 by inserting the social data items 30 into the search results 20 at a position associated with the relevance score of the social data item 30 as compared with the relevance scores of the search results 20 (e.g., sorting the social data results 30 into the search results 20 according to relevance scores.) As yet another integration technique, where social data items 30 are selected that have a positive interest trend (such as illustrated in the exemplary scenario 100 of FIG. 6), the social data items 30 may be inserted into the search results 20 at a position associated with a positive interest trend magnitude of the social data item 30 (e.g., social data items 30 having a very large positive interest trend magnitude, such as breaking news items, may be inserted at or near the top of the search results 20, while social data items 30 having a smaller but still positive interest trend magnitude may be inserted at a lower position in the search results 20.)

As a third example of this fifth aspect, if the social data items 30 are presented among or near the search results 20, it may be difficult for the user 12 to distinguish the personalized social data items 30 from the search results 20 in the search result set 42. Therefore, an embodiment of these techniques may be configured to emphasize one or more social data items 30 as compared with the search results 20 of the search result set 42. For example, the social data items 30 may be presented in bold or larger font, or may be highlighted in a different color. Moreover, social data items 30 may be presented with varying degrees of emphasis, e.g., with an emphasis magnitude that is proportional to a factor relating to the user interest of the user 12 in the social data item 30, such as a high relevance score indicative of a strong correlation of the social data item 30 with the search query 14. As another example, the emphasis magnitude of social data items 30 may vary proportionally with the nearness of the social data item 30 to the user 12 within the social network 22, e.g., proportional to a degree of personalization of the social data item 30 to the user 12, such that personal data items 30 that are specifically directed toward the user 12 are presented with stronger emphasis in the presentation 46.

Figure 7:
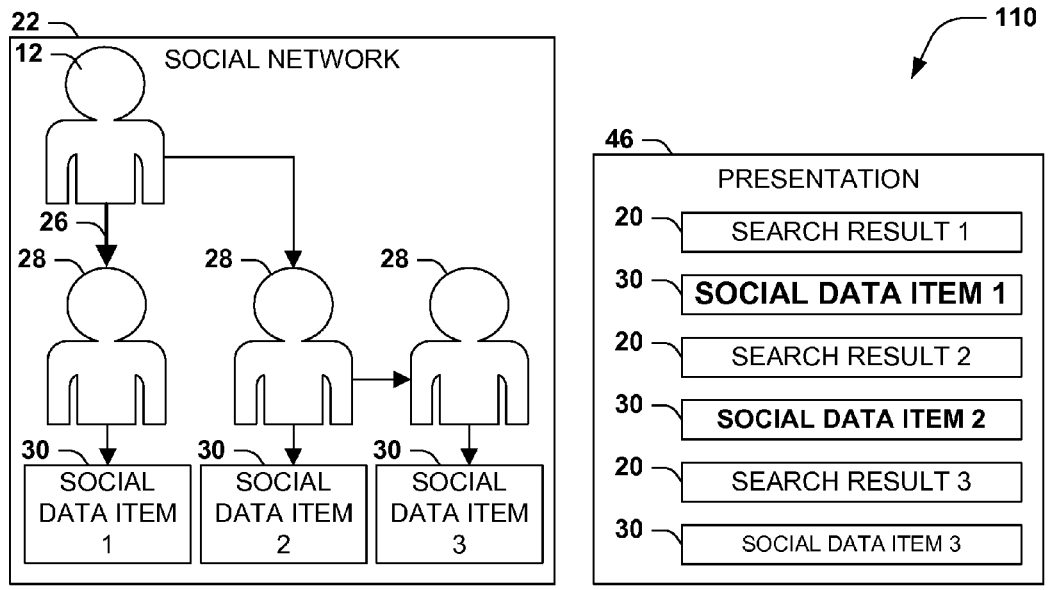
FIG. 7 is an illustration of an exemplary scenario featuring a presentation of search results and social data items selected from a social network of a user.

FIG. 7 presents an exemplary scenario 110 illustrating the application of several of these techniques in a presentation 46 of search results 20 and social data items 30. This exemplary scenario 110 involves a social network 22 comprising a user 12 having associations 26 with various associated users 28, each of which may generate a social data item 30 that is selected for inclusion in a presentation 46 responsive to a search query 14 generated by the user 12. In this exemplary scenario 110, the associated users 28 may have varying degrees of nearness to the user 12; e.g., a first associated user 28 may have a strong association 26 with the user 12 (such as a family relationship, a spousal relationship, or a long-standing close friendship), while a second associated user 28 may have a weaker association 26 with the user 12 (e.g., a casual friendship or an acquaintanceship), and a third associated user 28 may only have an association 26 with the second associated user 28 and not with the user 12. These degrees of nearness of the social data items 30 to the user 12 (based on the nearness of the user 12 with the associated user 28 who generated the social data item 30) may be reflected in the presentation 46 with different emphasis magnitudes. For example, the first social data item 30 may be presented in a large and bolded font to indicate a strong association 26 of the user 12 with the first associated user 28 who authored the social data item 30, while successively diminutive and less bolded fonts may be used for the second social data item 30 and the third social data item 30 to indicate the diminishing nearness of these social data items 30 to the user 12. Additionally, the social data items 30 in this presentation 46 are integrated with the search results 20, e.g., in an interleaved manner.

As a fourth example of this fifth aspect, the presentation 46 may initially feature only the search results 20 generated by the search engine 16 in response to the search query 14, but may subsequently supplement the search results 20 with the social data items 30. In a first such variation, the user 12 may be presented the search results 20, but the presentation 46 may include an offer to present personalized search results, and upon receiving from the user an acceptance of the offer (e.g., a notification that the user 12 clicked a button associated with the offer in the presentation), may present the social data items 30 to the user 12 within the presentation 46. This variation may promote the privacy of the user 12 (e.g., by conducting a detailed evaluation of the social network 22 and interests of the user 12 only with the consent of the user 12), and/or may improve the efficiency of the embodiment (e.g., by only conducting the potentially resource-intensive evaluation of the social network 22 upon the request of an interested user 12.) In a second such variation, the evaluation of the social network 22 and the selection of the social data items 30 may take a considerable amount of time, and it may be undesirable to withhold the presentation 46 from the user 12 during such evaluation and selection. Therefore, it may be desirable initially to present the search result set 42 to the user 12 (which may be performed rapidly), and to, upon completing the selection of social data items 30, insert the selected social data items 30 into the search result set 42 (e.g., using an asynchronous JavaScript and XML (AJAX)-based injection of new data into a previously rendered web page.) This insertion may be achieved, e.g., by inserting the social data items 30 into pre-allocated ("placeholder") regions of the search result set 42, or by repositioning search results 30 to accommodate the newly inserted social data items 30.

Figure 8:
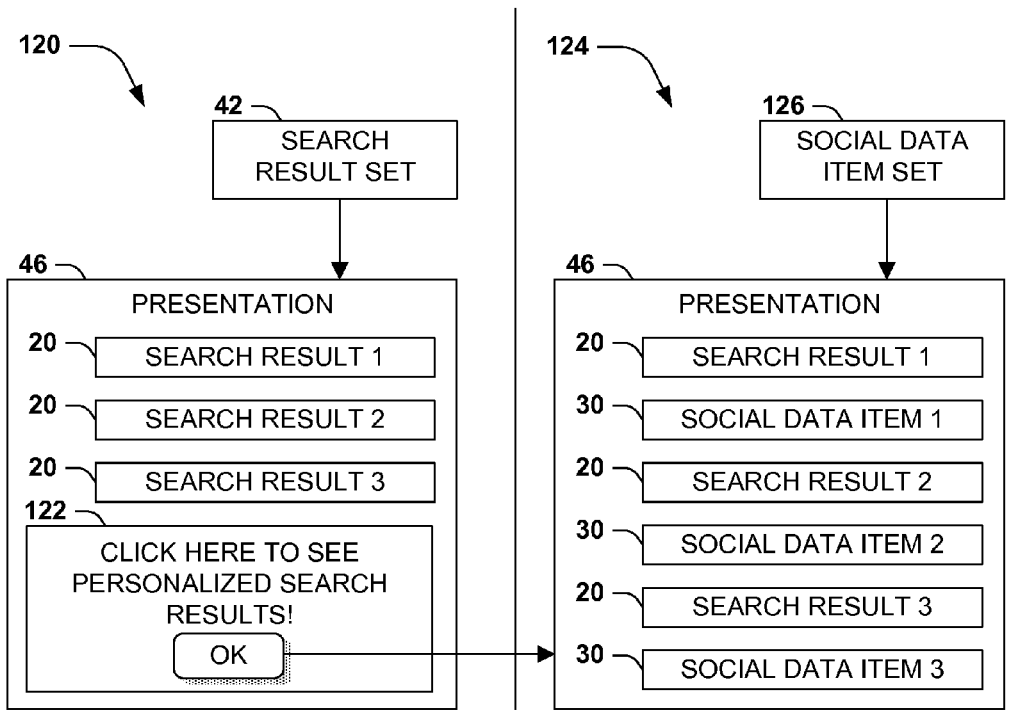
FIG. 8 is an illustration of an exemplary scenario featuring another presentation of search results and social data items selected from a social network of a user.

FIG. 8 presents an illustration of an exemplary scenario featuring several of these techniques. At a first time point 120 in this exemplary scenario, when the search result set 42 is provided by a search engine 16 in response to a search query 14, a presentation 46 may be rendered for the user 12 comprising the search results 20 of the search result set 42. However, the presentation 42 may include an offer 122 to view personalized search results, with a clickable button that the user 12 may activate to accept the offer. Upon receiving notification that the user 12 has accepted the offer, an embodiment of these techniques may initiate the selection of social data items 30 from the social network 22 of the user 12, which may take a nontrivial amount of time to complete. However, when the social data items 30 have been selected (e.g., as a social data items set 126 provided by the social network 22), the presentation 46 may be updated by integrating the social data items 30 with the search results 20, e.g., by inserting the social data items 30 at various positions in the search result set 42. In this manner, an embodiment of these techniques may respond rapidly to the search query 14 by presenting the search results 20, but may supplement the search results 20 with personalized search results (in the form of social data items 30 selected from the social network 22 of the user) when such supplementing is subsequently available and/or requested by the user 12.

As a fifth example of this fifth aspect, for topics 44 comprising products, an embodiment of these techniques may be configured to provide purchasing advice, based on the price of the product through one or more product vendors. For example, while presenting search results 20 and social data items 30 relating to a product, an embodiment may identify a current price of the product offered by at least one product vendor, and may evaluate the current price of the product to generate a product purchase recommendation for the product (e.g., a comparison of the current price of the product to the current prices of competing products may lead to a product recommendation to purchase the product instead of the competing products based on prices and features.) The product purchase recommendation for the product may then be included in the presentation 46. One such embodiment may have access to a product price database identifying at least one previous price of the product through at least one product vendor at a previous time, and may compare the current price of the product with the at least one previous price of the product. This comparison may reveal, e.g., price trends such as seasonal sales, inventory liquidation, or promotional prices, and the embodiment may include in the presentation 46 a product purchase recommendation based on this information. Those of ordinary skill in the art may devise many ways of presenting the search results 20 and the social data items 30 associated with the search query 14 of the user 12 while implementing the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
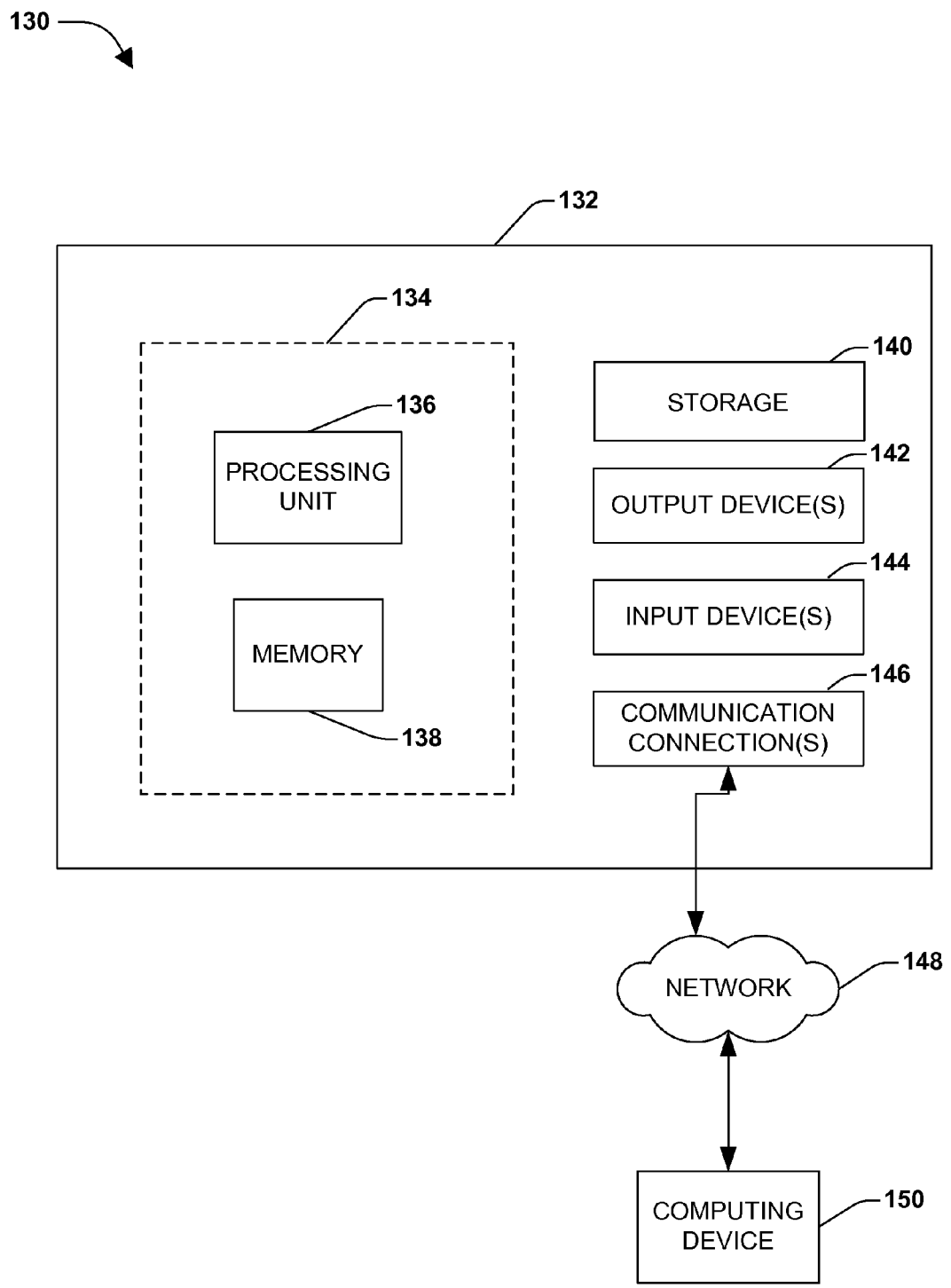
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 130 comprising a computing device 132 configured to implement one or more embodiments provided herein. In one configuration, computing device 132 includes at least one processing unit 136 and memory 138. Depending on the exact configuration and type of computing device, memory 138 may be volatile (such as RAM, for example), non-volatile (such as ROM, flash memory, etc., for example) or some combination of the two. This configuration is illustrated in FIG. 9 by dashed line 134.

In other embodiments, device 132 may include additional features and/or functionality. For example, device 132 may also include additional storage (e.g., removable and/or non-removable) including, but not limited to, magnetic storage, optical storage, and the like. Such additional storage is illustrated in FIG. 9 by storage 140. In one embodiment, computer readable instructions to implement one or more embodiments provided herein may be in storage 140. Storage 140 may also store other computer readable instructions to implement an operating system, an application program, and the like. Computer readable instructions may be loaded in memory 138 for execution by processing unit 136, for example.

The term "computer readable media" as used herein includes computer storage media. Computer storage media includes volatile and nonvolatile, removable and non-removable media implemented in any method or technology for storage of information such as computer readable instructions or other data. Memory 138 and storage 140 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 132. Any such computer storage media may be part of device 132.

Device 132 may also include communication connection(s) 146 that allows device 132 to communicate with other devices. Communication connection(s) 146 may include, but is not limited to, a modem, a Network Interface Card (NIC), an integrated network interface, a radio frequency transmitter/receiver, an infrared port, a USB connection, or other interfaces for connecting computing device 132 to other computing devices. Communication connection(s) 146 may include a wired connection or a wireless connection. Communication connection(s) 146 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 132 may include input device(s) 144 such as keyboard, mouse, pen, voice input device, touch input device, infrared cameras, video input devices, and/or any other input device. Output device(s) 142 such as one or more displays, speakers, printers, and/or any other output device may also be included in device 132. Input device(s) 144 and output device(s) 142 may be connected to device 132 via a wired connection, wireless connection, or any combination thereof. In one embodiment, an input device or an output device from another computing device may be used as input device(s) 144 or output device(s) 142 for computing device 132.

Components of computing device 132 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 132 may be interconnected by a network. For example, memory 138 may be comprised of multiple physical memory units located in different physical locations interconnected by a network.

Those skilled in the art will realize that storage devices utilized to store computer readable instructions may be distributed across a network. For example, a computing device 150 accessible via network 148 may store computer readable instructions to implement one or more embodiments provided herein. Computing device 132 may access computing device 150 and download a part or all of the computer readable instructions for execution. Alternatively, computing device 132 may download pieces of the computer readable instructions, as needed, or some instructions may be executed at computing device 132 and some at computing device 150.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of generating personalized search results for a search query generated by a selected user of a social network, steps of the method being variously performed by at least one computing device, and the method comprising:

for respective topics, detecting an interest trend in the topic among the users of the social network who are associated with the selected user;

applying the search query on a search engine indexing content items outside of the social network to generate a search result set comprising at least one search result that is not referenced by the users of the social network who are associated with the selected user;

identifying at least one topic associated with the search query;

selecting, within the social network of the user, at least one social data item that is referenced by the users of the social network who are associated with the selected user, associated with at least one topic associated with the search query, and exhibiting a positive interest trend among the users of the social network who are associated with the selected user; and providing for display to the selected user the at least one social data item integrated with the search result set.

2. The method of claim 1:

the method further comprising detecting a user interest expressed by the selected user regarding at least one topic; and selecting the at least one social data item within the social network comprising: selecting, within the social network of the selected user, at least one social data item associated with at least one topic in which the selected user has expressed a user interest.

3. The method of claim 2:

the search engine identifying search results associate with at least two topics that may be associated with the search query; and the method further comprising:

examining the social profile of the selected user within the social network to identify topics of interest to the selected user; and excluding search results that are associated with topics that are not of interest to the selected user.

4. The method of claim 1:
the search query specifying at least one social data item type; and
selecting the at least one social data item within the social network comprising: selecting, within the social network of the selected user, at least one social data item of the social data item type and associated with the at least one topic.

5. The method of claim 1, identifying the interest trend of respective topics comprising: identifying an interest trend in the topic according to a reference frequency of references to the topic by the users of the social network who are associated with the selected user.

6. The method of claim 1, identifying the interest trend of respective topics comprising: identifying an interest trend in the topic according to a user interaction frequency of user interaction of the users of the social network who are associated with the selected user with social data items associated with the topic.

7. The method of claim 1, identifying the interest trend of respective topics comprising: identifying an interest trend in the topic according to a search query frequency of search queries relating to the topic generated by the users of the social network who are associated with the selected user.

8. The method of claim 1:
at least one topic comprising a product, and
identifying the interest trend of the topic comprising: identifying an interest trend in the topic according to at least one user review of the product by at least one user of the social network who is associated with the selected user.

9. The method of claim 1, presenting the at least one social data item and the at least one search result to the selected user comprising: insert the social data items into the search results at a position associated with a positive interest trend magnitude of the social data item.

10. The method of claim 1, selecting the at least one social data item within the social network of the selected user comprising:
upon receiving from the selected user at least one social network credential, storing the at least one social network credential; and
upon receiving a search query from the selected user, authenticating the selected user with the social network using the at least one social network credential.

11. The method of claim 1, presenting to the selected user the at least one social data item and the search result set comprising: emphasizing the at least one social data item as compared with the at least one search result of the search result set.

12. The method of claim 1:
respective search results having a relevance score indicating a relevance of the search result to the search query;
respective search results positioned within the search result set at a position associated with the relevance score of the search result;
respective social data items having a relevance score indicating a relevance of the search result to the search query; and
integrating respective social data items with the search results of the search result set comprising: inserting the social data item into the search result set at a position associated with the relevance score of the social data item as compared with the relevance scores of the search results.

13. The method of claim 12:
respective social data items having a nearness to the selected user within the social network; and
the social data item inserted into the search result set at a position associated with the relevance score of the social data item and proportional to the nearness of the social data item to the selected user within the social network.

14. The method of claim 1, presenting to the selected user the at least one social data item and the search result set comprising:
presenting to the selected user the search result set and an offer to present personalized search results; and
upon receiving from the selected user an acceptance of the offer, presenting to the selected user the at least one social data item.

15. The method of claim 1, presenting to the selected user the at least one social data item and the search result set comprising:
presenting to the selected user the search result set; and
upon selecting the at least one social data item after presenting the search result set, inserting the social data items into the search result set.

16. The method of claim 1:
at least one topic associated with the product;
method further comprising:
identifying a current price of the product offered by at least one product vendor, and
evaluating the current price of the product to generate a product purchase recommendation for the product; and
presenting to the selected user the at least one social data item and the search result set comprising: presenting to the selected user the product purchase recommendation for the product at the current price.

17. The method of claim 1:
the device having a product price database identifying at least one previous price of the product through at least one product vendor at a previous time; and
evaluating the current price of the product comprising: comparing the current price of the product with the at least one previous price of the product.

18. The method of claim 1, further comprising: excluding from the search results social data item that do not exhibit a positive interest trend among the users of the social network who are associated with the selected user.

19. A computer-readable storage device configured to store instructions that, when variously executed by at least one device, cause the at least one device to present personalized search results for a search query generated by a selected user of a social network by:
for respective topics, detect an interest trend in the topic among the users of the social network who are associated with the selected user;
applying the search query on a search engine indexing content items outside of the social network to generate a search result set comprising at least one search result that is not referenced by the users of the social network who are associated with the selected user;
identifying at least one topic that is referenced within the social network and associated with the search query;
selecting, within the social network of the selected user, at least one social data item associated with at least one topic associated with the search query; and
select, within the social network of the selected user, at least one social data item that is referenced by the users of the social network who are associated with the selected user, associated with at least one topic associated with the search query, and exhibiting a positive interest trend among the users of the social network who are associated with the selected user; and providing for presentation to the selected user the at least one social data item integrated with the search result set.

20. A computer-readable storage medium comprising instructions that, when variously executed by at least one computing device having access to a social network and a search engine, generate personalized search results for a search query for display to a selected user of the social network, the search query specifying at least one social data item type, by:

upon receiving from the selected user at least one social network credential, storing the at least one social network credential; and detecting a user interest expressed by the selected user regarding at least one topic;

for respective topics, detecting an interest trend in the topic among the users of the social network who are associated with the selected user according to a reference frequency of references to the topic by the users within the social network who are associated with the selected user; and upon receiving a search query from the selected user:

applying the search query on a search engine indexing content items outside of the social network to generate a search result set comprising at least one search result that is not referenced by the users of the social network who are associated with the selected user;

authenticating the selected user with the social network using the at least one social network credential;

identifying at least one topic associated with the search query;

selecting at least one social data item of the social data item type that is referenced within the social network and associated with at least one topic associated with the search query, in which the selected user has expressed a user interest, and exhibiting a positive interest trend among the users of the social network who are associated with the selected user;

integrating the social data items with the search results in the search result set; and presenting to the selected user the at least one social data item and the search result set while emphasizing the at least one social data item as compared with the at least one search result of the search result set.

* * * * *